Figure 1:
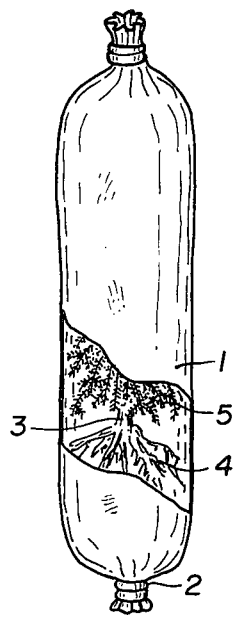

United States Patent [19]

Thoma et al.

[11] 4,006,561

[45] Feb. 8, 1977

[54] PLANT PACKAGE AND METHOD OF PREPARING THE SAME

[75] Inventors: Gustav Thoma, Eberbach; Fritz Tscharf, Hassmersheim; Helmut Astinet, Miltenberg, all of Germany

[73] Assignee: Pflanz-Frisch Transportsack GmbH, Hassmersheim (Neckar), Germany

[22] Filed: Sept. 7, 1972

[21] Appl. No.: 286,964

Related U.S. Application Data

[63] Continuation-in-part of Ser. No. 222,353, Jan. 31, 1972, abandoned.

[30] Foreign Application Priority Data

Feb. 5, 1971 Germany .......................... 2105348

[52] U.S. Cl. .................................. 47/58; 106/290; 206/423
[51] Int. Cl.² ...................................... A01B 79/00
[58] Field of Search ............... 47/34, 34.11, 58, 56, 47/DIG. 7; 206/46 PL, 423; 106/290

[56] References Cited

UNITED STATES PATENTS

| | | | |
|---|---|---|---|
| 2,512,459 | 6/1950 | Hamilton | 47/DIG. 7 |
| 2,720,726 | 10/1955 | Ferguson | 47/58 |
| 2,807,912 | 10/1957 | Bjorksten | 47/58 |
| 2,934,204 | 4/1960 | Pardee | 206/46 PL |
| 2,994,424 | 8/1961 | Selby et al. | 206/46 PL |
| 3,022,605 | 2/1962 | Reynolds | 47/34.11 X |
| 3,160,986 | 12/1964 | Watson et al. | 47/56 |
| 3,168,887 | 2/1965 | Bodell | 47/58 X |
| 3,172,234 | 3/1965 | Evans | 47/56 X |
| 3,256,941 | 6/1966 | Rivman | 47/56 X |
| 3,320,697 | 5/1967 | Larsen | 47/34.11 |
| 3,323,640 | 6/1967 | Kugler | 206/46 PL |
| 3,372,513 | 3/1968 | Schlesinger, Jr. et al. | 47/58 |
| 3,384,993 | 5/1968 | Kane | 47/58 |
| 3,395,486 | 8/1968 | Campbell et al. | 47/34 |

OTHER PUBLICATIONS

Modern Plastics, "Film on the Farm," p. 2, pp. 112–117, 232–237, vol. 34, No. 1, Sept. '56.
Horticulture, "Gardening With Plastics," pp. 359, 376, 368, 369, 380, vol. 31, No. 9, Sept. 1953.
British Plastics, "Plastics on the Farm," pp. 322–326; vol. 31, No. 8, Aug. 1958.

*Primary Examiner*—E. H. Eickholt
*Attorney, Agent, or Firm*—Hans Berman

[57] ABSTRACT

Living plants, such as young, evergreen or deciduous trees or bushes, can be stored without loss of viability for several months, and cut flowers can be stored for about a week without apparent loss or freshness when enclosed in a plastic sheet or film envelope which is waterproof, excludes at least 30% of incident visible light and substantially all incident infrared radiation, and is permeable to the gaseous constituents of air, but not more permeable to gaseous oxygen, carbon dioxide, and water vapor than low-density polyethylene film having a thickness of 20 micron.

12 Claims, 2 Drawing Figures

PLANT PACKAGE AND METHOD OF PREPARING THE SAME

This application is a continuation-in-part of the co-pending application Ser. No. 222,353, filed on Jan. 31, 1972, now abandoned.

This invention relates to the transportation and storage of entire live plants and parts of plants, and particularly to a plant package including the plant or plant part to be transported and/or stored, and an envelope of sheet material enclosing the plant, the term being used herein to include plant parts, such as cut flowers, which still show vital functions, and to a method of making a plant package.

It is common practice to transport trees, bushes, and other woody and herbaceous plants from a nursery or other place, in which they were grown in soil or another suitable substrate, to another place for replanting. The period from removal of the plant from its initial location to replanting in another location may be of the order of days or even months, and special precautions must be taken in many instances to keep the plants viable.

Trees, shrubs, and other plants are frequently balled and burlaped for transportation and transplanting, that is, their roots are enveloped in suitable soil sufficiently moist to maintain a normal growing environment, and the ball of soil is enclosed in an outer envelope of burlap for protection against mechanical damage. The method is effective, but costly in labor and in the weight to be transported.

Other envelopes protecting the bare roots of a plant withdrawn from the soil during transportation and prior to planting have therefore been proposed and are in successful use under conditions which favor survival of the plant, such as a short span of time in which the roots are outside of soil, favorable climatic conditions, a suitable stage in the cycle of plant life, and the like. Ordinary wrapping paper, sack cloth, straw, plastic foil, aluminum foil, and the like have been used.

The known envelopes can adequately protect young trees having bare roots against permanent damage by dehydration during a short period of transportation, but are not capable of keeping such trees viable under unfavorable conditions encountered while in transit nor during subsequent storage prior to replanting. It is necessary temporarily to bury the roots of the trees after arrival with as much care as would be expended in ultimate replanting if the plants cannot immediately be planted where they are expected to grow to maturity. A substantial amount of labor is required for this temporary storage procedure, and is wasted if the plants were damaged beyond repair during transportation in a manner not immediately ascertainable.

Decorative plants, such as young rose bushes, are commonly sold in plastic foil or film bags which are transparent and expose the entire plant to light and invisible solar radiation, while providing some protection against dehydration. The bags are ready breeding grounds for bacteria and fungi which account for at least a portion of the poor growth observed in a significant number of plants which had been kept in plastic bags prior to planting. Plastic bags were briefly tried for protecting young forest trees having bare roots, but were found to be unsatisfactory.

The primary object of the invention is the provision of a plant package in which a plant, such as a tree or shrub having bare roots, but also a plant part, such as cut flowers, is enclosed in an envelope in which it may be stored for relatively long periods under ordinary atmospheric conditions without loss of viability or vital functions.

A concomitant object is the provision of a method of preparing such a package.

It has been found that the metabolism of plants and plant parts is reduced to a minimum under conditions which simulate normal night light. Such light is normally not more than 30% of daylight as it prevails in areas outside of direct sun light, and is practically free of infrared radiation. Under such conditions, plants neither metabolize available reserves of organic matter, nor do they consume water to an appreciable extent. The plants are in a dormant state comparable to the hibernation of animals, and may be returned to full life by exposure to visible light, and particularly to infrared radiation which is necessary to the metabolism of the leaves. They resume their growth as if it had never been interrupted.

The package according to this invention thus consists of a living plant, the term including a plant part, enclosed in an envelope of sheet material which permits the plant to live for an extended period in the dormant state, but prevents the plant from emerging from this state. To satisfy these requirements, the envelope must not be permeable to more than 30% of incident visible light, and should not pass more than 10% of such light if the package may be exposed to direct sunlight for any significant length of time. The envelope should be practically impervious to infrared radiation and waterproof, permeable to some extent to the gaseous components of atmospheric air, but not more permeable to gaseous oxygen, carbon dioxide, and water vapor than low-density polyethylene film having a thickness of 20 micron. The lower permissible limit of gas permeability differs greatly from plant to plant, but is represented typically by that of a low-density polyethylene film or sheet having a thickness of 400 micron.

The limiting thickness values were determined on polyethylene representative of the commercial low-density material having virtually no water absorption, a water vapor permeability of 1.3 g/100 sq.in./24 hr./mil thickness at 25° C, and respective permeabilities to gaseous carbon dioxide and oxygen of 2700 and 500 cc/100 sq.in./mil thickness/24 hr./atmos. at 25° C, according to ASTM Standards E-96-635(E) and D-1434-63. Such polyethylene sheet material is available at lower cost than any other suitable sheet material and is the preferred synthetic resin composition employed in the package of this invention. Medium- and high density polyethylene, polypropylene, and fluorinated polyalkylenes have the required properties when employed in suitable thickness, but are not economically desirable at this time.

The basic resin composition is transparent to visible light, does not block infrared radiation, and must be modified by suitable pigments, other coloring matter, and the like. It has been found advantageous to use a laminar sheet material in which the outer layer contains metallic particles, such as aluminum flakes, in an amount sufficient to reflect incident infrared radiation substantially completely and to attenuate visible light which may then be absorbed by pigment particles or other coloring matter in an inner layer sufficient to reduce the permeability of the envelope to incident visible light to less than 30%, and preferably to less than 10%. Because one layer alone may provide the desired limited permeability to gases and moisture, all but one of the layers may be made of a material not meeting the criteria for gas and water vapor permeability indicated above.

The appended drawing illustrates an embodiment of the invention.

Figure 2:
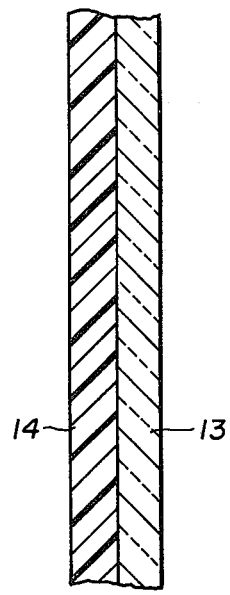

FIG. 1 shows a package of the invention in elevation, a portion of the outer envelope being broken away to reveal its contents; and FIG. 2 shows the envelope material of the package of FIG. 1 in enlarged cross section.

The package envelope consists of a tubular bag 1 whose two ends are closed by ties 2. The envelope encloses an evergreen tree whose trunk 3 carries bare roots 4 and branches 5. The envelope material is laminar, as best seen in FIG. 2, and has an outer layer 13 of transparent polyethylene in which aluminum flakes, too small to permit representation on the scale of FIG. 2, are dispersed. The inner layer 14 consists of polyethylene and enough dispersed carbon black to appear opaque.

The following Example is further illustrative of this invention, and it will be understood that the invention is not limited thereto.

EXAMPLE

A Douglas fir about 10–12 inches tall was dug out of the ground at a tree nursery, and most adhering soil was removed from the roots by cautious knocking. The plant then was inserted in its entirety into a plastic bag, 50 cm × 60 cm, made from laminar polyethylene foil having an overall thickness of 100 micron, and consisting of two layers, each 50 micron thick. The inner layer contained 2.5% carbon black and appeared totally opaque to the unaided eye, while the outer layer different from the inner layer had a metallic grey color from aluminum flakes dispersed therein. The actual light absorption of the laminar material was found to be near 98% for visible light and higher for infrared light. Its permeability values for gaseous oxygen, carbon dioxide, and nitrogen respectively were found to be 60, 250, and 23 cc/dm$^2$/24 hrs/1 atm at room temperature.

The open side of the bag was folded over several times after insertion of the small tree, and the fold was secured by taping. The package so obtained is shown in the drawing. It was stored without man-made shelter in a forest where it was exposed to day light, though partly shaded, to the ambient atmosphere, and to rain. After three months, the bag was opened, and the plant was withdrawn. It had not lost any of its original water content, appeared perfectly fresh, and did not show any symptoms of transplanting damage. It was not distinguishable from a freshly dug specimen of the same kind.

It was planted in soil in the usual manner, and resumed its growth without the inhibition period frequently observed in transplanted nursery stock. During the next 6 months, it was carefully inspected at intervals of about 3 weeks, and did not show any unfavorable after-effects of the storage period, such as a diminished growth rate.

In a control test, another healthy Douglas fir of the same size and properties was stored under otherwise identical conditions in a clear bag of polyethylene differing from the afore-described bag in being free of coloring matter and metal particles, and thus practically fully transparent. When withdrawn from the clear polyethylene bag after three months, the small tree had lost most of its water content. The needles were brown, and most had dropped from the branches. No sign of life developed after the tree was planted in soil using the same conventional precautions that had been applied in planting the tree stored under conditions of night light.

Similarly advantageous results have been achieved with other types of nursery stock including other coniferous and deciduous trees, evergreen and deciduous ornamental bushes, and even herbaceous plants. Various types of cut flowers remained fresh for 4–7 days in laminar foil bags of the type described in the above Example, and did not wilt more rapidly after withdrawal and immersion of their stems in water than corresponding freshly cut flowers when kept under the same conditions.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A method of storing a living plant which comprises:
   a. enclosing said plant in an envelope of sheet material,
      1. said envelope being permeable to not more than 30% of incident visible light, substantially impervious to infrared radiation, waterproof, permeable to the gaseous components of atmospheric air, but not substantially more permeable to gaseous oxygen, carbon dioxide, and water vapor than low-density polyethylene film having a thickness of 20 microns;
   b. storing the enclosed plant;
   c. withdrawing the stored plant from said envelope; and
   d. planting the withdrawn plant in soil.

2. A method as set forth in claim 1, wherein said enclosed plant is stored for a plurality of months prior to said withdrawing.

3. A method as set forth in claim 2, wherein said plant is enclosed in said envelope at a first location, and transported to a second location prior to said withdrawing.

4. A method as set forth in claim 2, wherein said plant is an evergreen having roots, said evergreen being dug out of the ground, and most adhering soil being removed from said roots after said digging out and prior to said enclosing until said roots are bare.

5. A method as set forth in claim 1, wherein said envelope is permeable to not more than 10% of incident visible light.

6. A method as set forth in claim 1, wherein said envelope has an outer layer consisting essentially of synthetic resin composition and solid particles reflecting said infrared radiation, and an inner layer consisting essentially of synthetic resin composition and coloring matter in an amount sufficient to reduce the permeability of said envelope to incident visible light to not more than 10%.

7. A plant package comprising:
   a. an envelope of laminar sheet material,
      1. said sheet material having an outer layer essentially consisting of synthetic resin composition and solid particles reflecting infrared radiation, and an inner layer different from said outer layer and essentially consisting of synthetic resin composition and coloring matter, 2. said envelope being permeable to not more than 30% of incident visible light, waterproof, permeable to the gaseous components of atmospheric air, but not substantially more permeable to gaseous oxygen, carbon dioxide, and water vapor than low-density polyethylene film having a thickness of 20 microns, 3. the amount of said solid particles being sufficient to make said envelope substantially impervious to infrared radiation; and b. a living plant enclosed in said envelope.

8. A package as set forth in claim 7, wherein said plant is an evergreen tree having bare roots.

9. A package as set forth in claim 8, wherein said synthetic resin composition in at least one of said layers is polyethylene.

10. A package as set forth in claim 9, wherein the permeability of said envelope to gaseous oxygen, carbon dioxide, and water vapor is not substantially smaller than the corresponding permeability of low-density polyethylene film 400 micron thick.

11. A package as set forth in claim 8, wherein said envelope is permeable to not more than 10% of incident visible light.

12. A package as set forth in claim 7, wherein said outer layer is grey due to the presence of said solid particles.

* * * * *